United States Patent
Yerramalli et al.

(10) Patent No.: US 9,534,580 B2
(45) Date of Patent: Jan. 3, 2017

(54) FLUID TURBINE BLADE WITH TORSIONALLY COMPLIANT SKIN AND METHOD OF PROVIDING THE SAME

(71) Applicant: General Electric Company, Schenectady, NY (US)

(72) Inventors: Chandra Sekher Yerramalli, Raleigh, NC (US); Peggy Lynn Baehmann, Glenville, NY (US); Ken Ivcar Salas, Schenectady, NY (US); Mohammad Salah Attia, Niskayuna, NY (US); Haifeng Zhao, Houston, TX (US)

(73) Assignee: General Electric Company, Niskayuna, NY (US)

( * ) Notice: Subject to any disclaimer, the term of this patent is extended or adjusted under 35 U.S.C. 154(b) by 801 days.

(21) Appl. No.: 13/778,646

(22) Filed: Feb. 27, 2013

(65) Prior Publication Data
US 2014/0241895 A1    Aug. 28, 2014

(51) Int. Cl.
*F03D 1/06* (2006.01)

(52) U.S. Cl.
CPC ........... *F03D 1/0675* (2013.01); *F03D 1/0683* (2013.01); *F05D 2230/23* (2013.01); *Y02E 10/721* (2013.01); *Y10T 29/49336* (2015.01)

(58) Field of Classification Search
CPC .............. F05D 2230/23; F05D 2240/21; F05D 2240/221; F05D 2240/2212; F05D 2240/311; F05D 2240/32; F05D 2280/6003; F05D 1/0674; F05D 1/0683
See application file for complete search history.

(56) References Cited

U.S. PATENT DOCUMENTS

| 1,949,785 | A | * | 3/1934 | De La Cierva | B64C 27/023 |
| | | | | | 416/226 |
| 2,473,134 | A | * | 6/1949 | Bonnett | B64C 27/473 |
| | | | | | 416/226 |
| 2,589,193 | A | * | 3/1952 | Mayne | B64C 27/473 |
| | | | | | 416/233 |

(Continued)

FOREIGN PATENT DOCUMENTS

| WO | 2011029882 A2 | 3/2011 |
| WO | WO 2011067323 A2 * | 6/2011 | ........... F03D 1/0683 |

OTHER PUBLICATIONS

Goeij et al., "Implementation of Bending-Torsion Coupling in the Design of a Wind-Turbine Rotor-Blade", Applied Energy, vol. 63, Issue 3, pp. 191-207, Jul. 1999.

(Continued)

*Primary Examiner* — Mary A Davis
(74) *Attorney, Agent, or Firm* — Ann M. Agosti (57) ABSTRACT

A fluid turbine blade and method of fabrication are provided. The fluid turbine blade includes a centrally disposed longitudinal spar having a substantially circumferential cross section. The fluid turbine blade also includes at least one chord stiffener coupled to the longitudinal spar. The fluid turbine blade further includes a torsionally compliant segmented skin coupled to the at least one chord stiffener. The centrally disposed longitudinal spar and the torsionally compliant segmented skin are functionally decoupled to relieve the torsionally compliant segmented skin of one or more of a flapwise load condition, an edgewise load condition and a torsional load condition.

13 Claims, 8 Drawing Sheets

(56) References Cited

U.S. PATENT DOCUMENTS

| | | | |
|---|---|---|---|
| 2,631,676 A * | 3/1953 | Hiller, Jr. | B64C 27/18 |
| | | | 416/21 |
| 4,295,790 A * | 10/1981 | Eggert, Jr. | F03D 1/0683 |
| | | | 416/226 |
| 4,409,050 A | 10/1983 | Carter et al. | |
| 7,891,949 B2 | 2/2011 | Baker et al. | |
| 8,012,299 B2 | 9/2011 | Hancock | |
| 8,043,067 B2 | 10/2011 | Kuroiwa et al. | |
| 8,075,278 B2 | 12/2011 | Zuteck | |
| 8,079,819 B2 | 12/2011 | Zuteck | |
| 8,167,570 B2 | 5/2012 | Yerramalli et al. | |
| 8,177,515 B2 * | 5/2012 | Hibbard | F03D 1/0683 |
| | | | 416/226 |
| 8,382,440 B2 * | 2/2013 | Baker | F03D 1/0683 |
| | | | 416/226 |
| 9,156,559 B2 * | 10/2015 | Grip | B64D 27/24 |
| 9,199,301 B2 * | 12/2015 | Rajasingam | B29C 33/12 |
| 2009/0140527 A1 | 6/2009 | Pawar et al. | |
| 2010/0068065 A1 | 3/2010 | Jensen | |
| 2011/0081247 A1 | 4/2011 | Hibbard | |
| 2011/0123344 A1 * | 5/2011 | Yerramalli | F03D 1/0675 |
| | | | 416/226 |
| 2011/0142662 A1 | 6/2011 | Fritz et al. | |
| 2011/0182730 A1 | 7/2011 | Link | |
| 2011/0206529 A1 | 8/2011 | Bell et al. | |
| 2011/0243750 A1 | 10/2011 | Gruhn et al. | |
| 2011/0274552 A1 | 11/2011 | Torrez Martinez | |
| 2012/0045343 A1 | 2/2012 | Hancock et al. | |
| 2012/0114497 A1 * | 5/2012 | Petersen | F03D 1/0683 |
| | | | 416/241 R |
| 2013/0064663 A1 * | 3/2013 | Loth | F03D 1/0675 |
| | | | 416/44 |

OTHER PUBLICATIONS

Bir, "Computerised Method for Preliminary Structural Design of Composite Wind Turbine Blades", National Wind Technology Centre, vol. 123, Issue 4, Nov. 2001.

Griffin, "Composite Technologies for Large Wind Turbine Blades", Blade System Design Technologies, vol. 1, Jul. 2002.

Zuteck., "Adaptive Blade Concept Assessment: Curved Planform Induced Twist Investigation", Sandia National Laboratories, Oct. 2002.

* cited by examiner

FLUID TURBINE BLADE WITH TORSIONALLY COMPLIANT SKIN AND METHOD OF PROVIDING THE SAME

BACKGROUND

The disclosure relates generally to fluid turbine blades and more particularly, to a fluid turbine blade including decoupled structural stiffness and torsionally compliant segmented non-structural skin.

Commonly, fluid turbines are employed to generate electricity from kinetic energy of fluids. Two non-limiting turbine examples include wind energy and marine hydrokinetic energy turbines. Such turbines include three major components: a structural support component, a generator component and a rotor component. The rotor component further includes turbine blades that are employed to convert the kinetic energy of fluid to a mechanical energy. Furthermore, the mechanical energy is converted to electricity with the help of the generator component.

Typically, wind turbine blades, for example, include a rectangular or I-shaped spar disposed along a span of the wind turbine blade. The spar carries a major portion of a load induced by the kinetic energy of the wind on the wind turbine blade. The load is directed at an angle on the wind turbine blade and results in a multiaxial loading of the rectangular or I-shaped spar. The multiaxial state of loading including flapwise bending, edgewise bending and torsion, induces warping of the rectangular or I-shaped spar and results in higher stresses in the rectangular or I-shaped spar. Therefore, the multiaxial state of loading leads to an inefficient design and excess material utilization. The excess material utilization results in a heavier wind turbine blade. Furthermore, the inefficient design increases the maintenance cost and reduces life of the wind turbine blade.

Advanced aeroelastic axial-twist coupling is seen as a way to shed the multiaxial load and a control mechanism. The wind turbine blades with rectangular or I-beam spars are not conducive for inducing the axial twist coupling and result in a more complicated aerodynamic shape to achieve axial twist coupling. The complicated shapes lead to increased cost of manufacturing and design complexity.

New wind blade designs incorporating enhanced twist properties enable load shedding, thereby producing a reduction in loads. The lower loads allow the length of the blade to be increased resulting in larger annualized energy production (AEP). Due to the increased twist in blades of this design, buckling of the outer skin may occur when under the effects of aerodynamic pressure.

Hence, there is a need for an improved fluid turbine blade design to address one or more aforementioned issues.

BRIEF DESCRIPTION

These and other shortcomings of the prior art are addressed by the present disclosure, which provides a fluid turbine blade and method of fabrication.

In accordance with an embodiment, provided is a fluid turbine blade. The fluid turbine blade including a centrally disposed longitudinal spar having a substantially circumferential cross section, at least one chord stiffener coupled to the longitudinal spar and a torsionally compliant segmented skin overlying and coupled to the at least one chord stiffener. The centrally disposed longitudinal spar and the torsionally compliant segmented skin are functionally decoupled to relieve the torsionally compliant segmented skin of one or more of a flapwise load condition, an edgewise load condition and a torsional load condition.

In accordance with another embodiment, provided is a method of fabricating a fluid turbine blade. The method including centrally disposing a longitudinal spar of a fluid turbine blade having a substantially circumferential cross section, coupling at least one chord stiffener to the longitudinal spar and coupling a torsionally compliant segmented skin to the at least one chord stiffener. The centrally disposed longitudinal spar and the torsionally compliant segmented skin are functionally decoupled to relieve the torsionally compliant segmented skin of one or more of a flapwise load condition, an edgewise load condition and a torsional load condition.

In accordance with yet another embodiment, provided is a wind turbine blade. The wind turbine blade including a centrally disposed longitudinal spar of the wind turbine blade having a substantially circumferential cross section, at least one chord stiffener coupled to the centrally disposed longitudinal spar and a torsionally compliant segmented skin overlying and coupled to the at least one chord stiffener. The centrally disposed longitudinal spar and the torsionally compliant segmented skin are functionally decoupled to relieve the torsionally compliant segmented skin of one or more of a flapwise load condition, an edgewise load condition and a torsional load condition.

Other objects and advantages of the present disclosure will become apparent upon reading the following detailed description and the appended claims with reference to the accompanying drawings.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

As discussed in detail below, embodiments of the present disclosure include an improved fluid turbine blade that discloses a longitudinal spar disposed at a center of the fluid turbine blade having a substantially circumferential cross section. The fluid turbine blade includes at least one chord stiffener that is externally coupled to the longitudinal spar. The at least one chord stiffener is coupled to a torsionally compliant segmented skin of the fluid turbine blade. The centrally disposed longitudinal spar and the torsionally compliant segmented skin are functionally decoupled to relieve the torsionally compliant segmented skin of one or more of the flapwise, edgewise and torsional load conditions. Although wind turbine blades are discussed for purposes of example, the disclosure is also applicable to other types of fluid blades with marine hydrokinetic energy turbine blades being one such example.

Conventionally, a wind turbine blade includes a rectangular or I-shaped spar and a skin attached above the rectangular or I-shaped spar. The spar is enclosed within the skin and is attached to the skin along a span of the wind turbine blade. The skin is in direct contact with an incoming flow of wind. In operation, the wind flow comes in contact with the aerodynamic profile of the wind turbine blade and transfers a kinetic energy of the wind flow to the wind turbine blade in the form of a multiaxial state of loads. The rectangular or I-shaped spar is the stiffest structural member of the wind turbine blade and carries bulk of the multiaxial load. The resultant from the multiaxial wind loading is not always aligned along the principal directions of the wind turbine blade. The resultant from the multiaxial wind loading results in a combination of bending and twisting to happen in the wind turbine blade and in the rectangular or I-shaped spar. The bending and warping creates higher design stresses resulting in manufacturing a heavier blade and furthermore, an increased cost of electricity. Therefore, an improved design for a wind turbine blade is described below.

Figure 1:
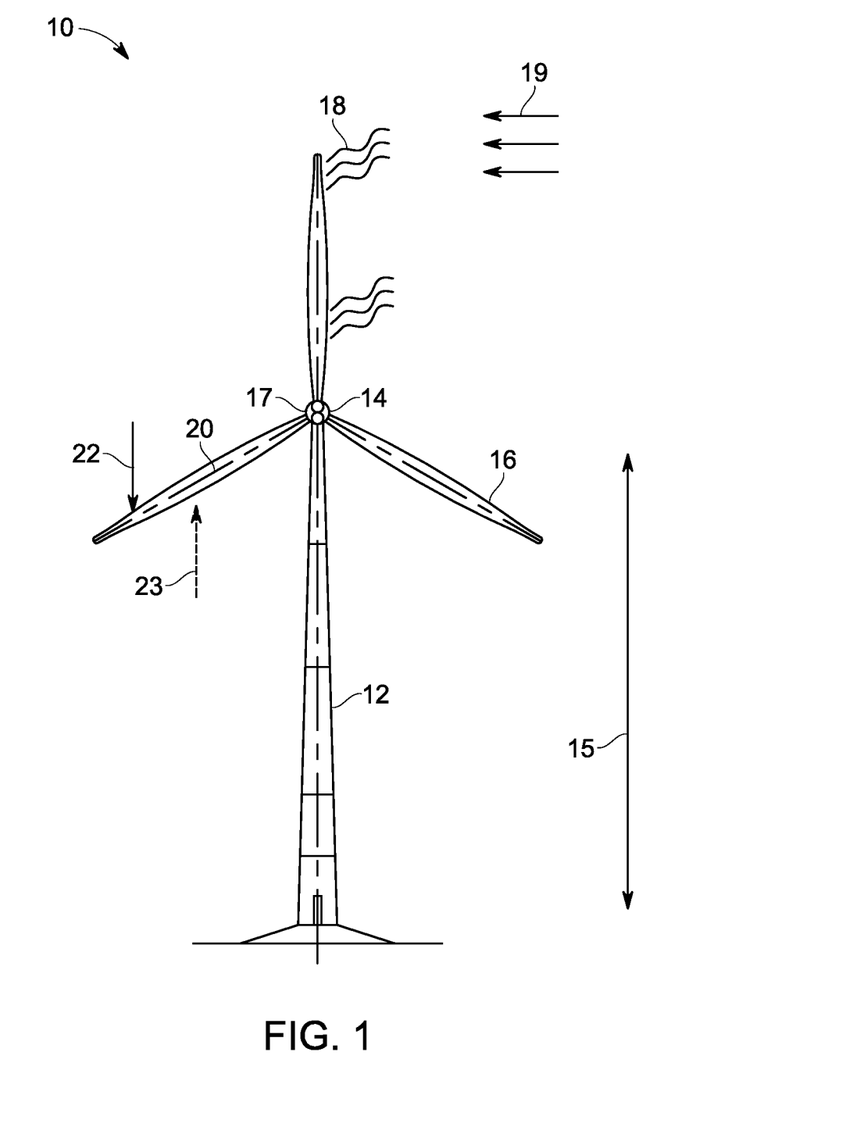
FIG. 1 is a schematic illustration of an exemplary wind turbine blade system in accordance with an embodiment of the disclosure.

FIG. 1 is a schematic view of an exemplary fluid turbine blade system 10 which is illustrated as a wind turbine blade for purposes of discussion. The wind turbine blade system 10 is employed to convert wind energy to electricity. Generally, the wind turbine blade system 10 includes a tower 12 to support a generator 14 at a height 15 selected based upon factors and conditions known in the prior art. A tower mount (not shown) is provided at a top of the tower 12 to attach the generator 14. The generator 14 generates electricity by utilizing mechanical energy provided by wind turbine blades 16. The wind turbine blades 16 are attached to the generator 14 via a blade mount 17 disposed at the alternator 14. The wind turbine blades 16 rotate via a lift force 18 provided by the incoming flow of wind 19 and convert the wind energy into mechanical energy. The wind turbine blades 16 include a centrally disposed longitudinal spar 20 having a substantially circumferential cross section to carry a load represented by reference numeral 22 induced by the lift force 18. A drag force 23 acts in an opposite direction to the lift force 18. The drag force 23 is induced via a resistance caused by friction in a direction opposite to that of the motion of the wind turbine blade 16. The design of the wind turbine blades 16 will be described in detail with reference to FIGS. 2-12 below.

Figure 2:
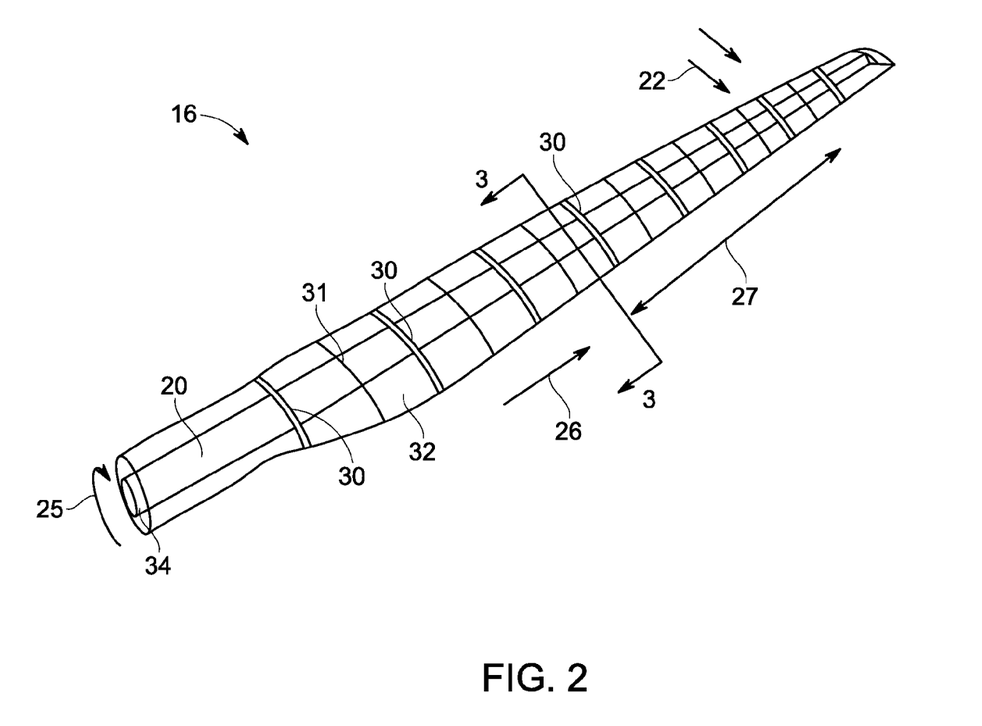
FIG. 2 is a schematic representation of a wind turbine blade in the wind turbine blade system shown in FIG. 1 in accordance with an embodiment of the disclosure.

In an illustrated embodiment of the disclosure as shown in FIG. 2, a schematic representation of a wind turbine blade 16 of the wind turbine blade system 10 (FIG. 1) is depicted. In the illustrated embodiment, portions of the wind turbine blade 16, and namely a torsionally compliant segmented skin (described presently), are represented as transparent to allow for ease in understanding. The longitudinal spar 20 having a substantially circumferential cross section is disposed at a center of the wind turbine blade 16. As used herein "substantially circumferential cross section" means a cross section having a shape, such as a circle, an ellipse, a D-shape, or any other closed shape, with a substantially curved perimeter. In one embodiment of the disclosure, the centrally disposed longitudinal spar 20 includes a hollow spar. In an alternative embodiment, the centrally disposed longitudinal spar 20 includes a solid, partially filled, or filled spar. The substantially circumferential cross section of the longitudinal spar 20 disperses the load 22 (FIG. 1) uniformly along the longitudinal spar 20 and provides a minimum axial twist represented by reference numeral 25 to the longitudinal spar 20. In yet another embodiment of the disclosure, the shape of the longitudinal spar 20 includes a tapering cross-sectional area in a direction 26 along a span 27 of the wind turbine blade 16.

The wind turbine blade 16 further includes at least one chord stiffener 30 coupled to the longitudinal spar 20 and a torsionally compliant segmented skin 32. The torsionally compliant segmented skin 32 is configured overlying and coupled to the at least one chord stiffener 30. In an exemplary embodiment, included are a plurality of chord stiffeners 30, each coupled to the centrally disposed longitudinal spar 20 and spaced apart one from another. In certain embodiments, the at least one chord stiffener 30 is a curved member fabricated from at least one from a group of glass composite, carbon composite or a combination thereof. In another embodiment of the disclosure, the at least one chord stiffener 30 is a hollow or a solid structure depending on design and weight constraints. In yet another embodiment, the at least one chord stiffener 30 is fabricated via commonly known processes such as either one from a group of automated fiber/tow placement with preimpregnated fibers/tow or vacuum assisted resin transfer molding (hereinafter VARTM) process. The at least one chord stiffener 30 is coupled to an outer surface 34 of the centrally disposed longitudinal spar 20 via any one from a commonly known group of an adhesive, a wet layup process or a suitably designed riveting process. Furthermore, the at least one chord stiffener 30 transfers loads exerted upon the at least one chord stiffener 30 to the longitudinal spar 20 resulting in a spar load. In an embodiment, the at least one chord stiffener 30 is configured integrally with the torsionally compliant segmented skin 32, or formed as separate elements that are bonded to the torsionally compliant segmented skin 32. In an embodiment, the torsionally compliant segmented skin 32 includes one or more compliant joints 31, to segment the torsionally compliant segmented skin 32, and will be described in greater detail with reference to schematic and cross sectional views of the wind turbine blade 16 as shown in FIGS. 9-12.

Figure 3:
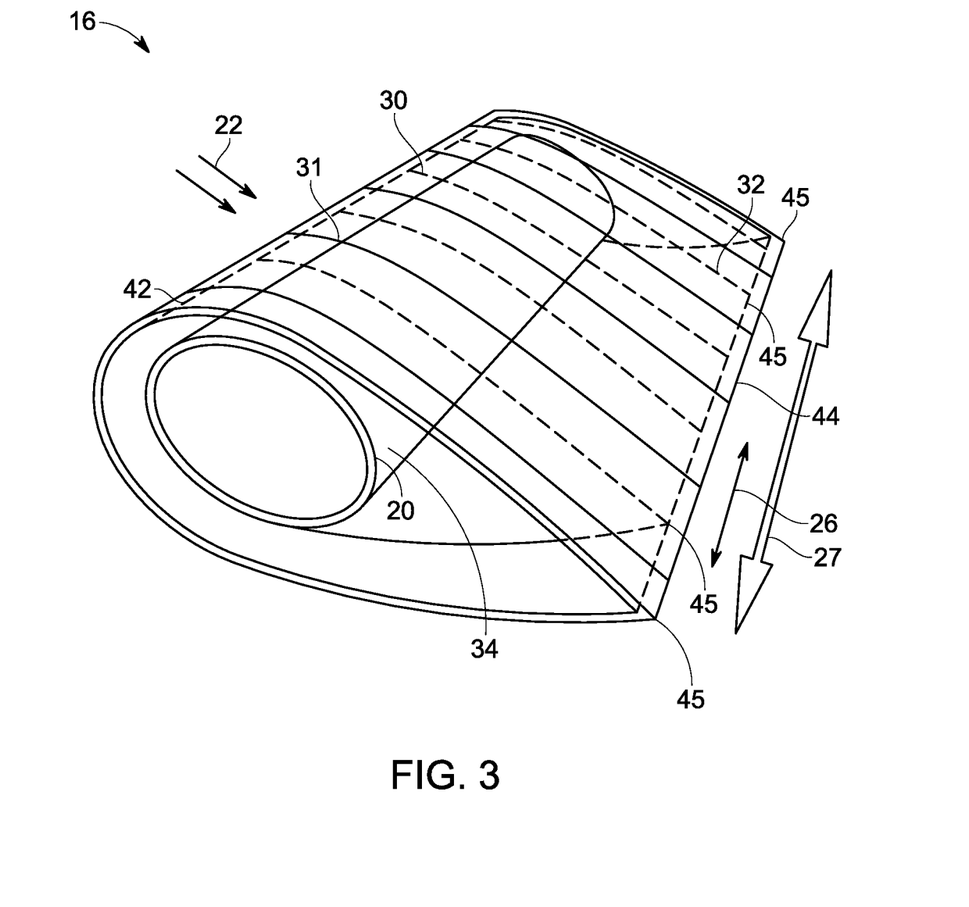
FIG. 3 is a schematic cross-sectional view of a portion of the wind turbine blade shown in FIG. 2 in accordance with an embodiment of the disclosure.
Figure 4:
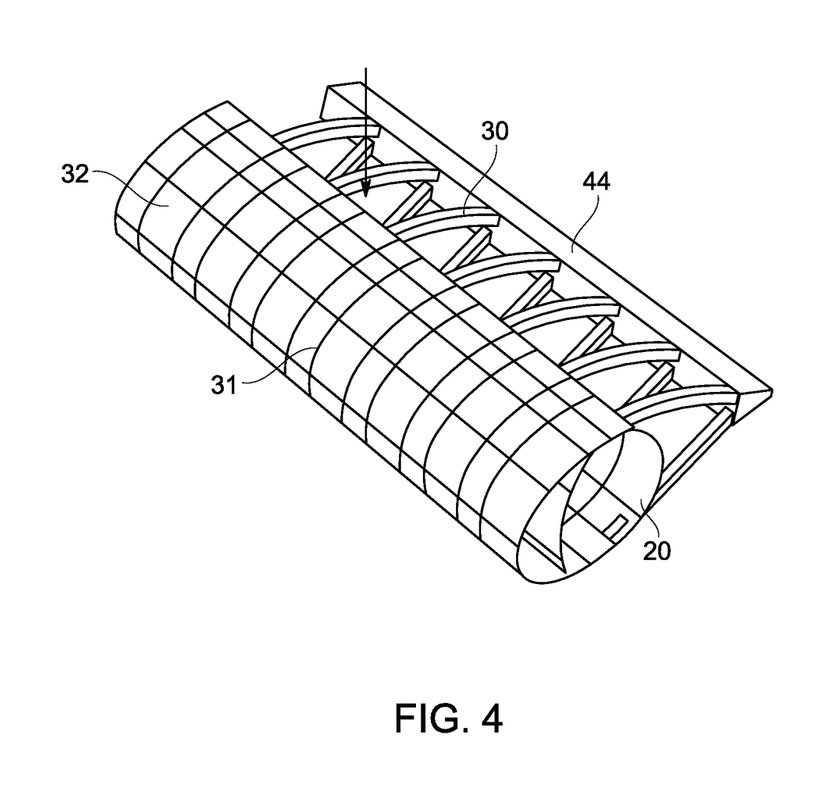
FIG. 4 is a schematic cross-sectional cut-away isometric view of a portion of the wind turbine blade shown in FIG. 2 in accordance with an embodiment of the disclosure.

Referring now to FIGS. 3 and 4, FIG. 3 schematically illustrates a portion of the wind turbine blade 16 taken through line 3-3 of FIG. 2 and FIG. 4 illustrates a cut-away view of a portion of the wind turbine blade 16. In the illustrated embodiment, the torsionally compliant segmented skin 32 is fabricated via attachment to a leading edge piece 42 and a trailing edge piece 44 via an adhesive. In an alternate embodiment of the disclosure, the leading edge piece 42 and the trailing edge piece 44 are fabricated separately and bonded to the torsionally compliant segmented skin 32 and/or the at least one chord stiffener 30, or alternatively formed integral therewith the at least one chord stiffener 30. In an embodiment of the disclosure, the leading edge piece 42 and the trailing edge piece 44 are optionally segmented, corresponding with the one or more compliant joints 31 formed in the torsionally compliant segmented skin 32. In an embodiment of the disclosure, the leading edge piece 42 and the trailing edge piece 44 may be attached one to another via the at least one chord stiffener 30 at one or more span points 45 along the span 27 of the wind turbine blade 16 (FIG. 2). As used herein, the term "span point" 45 refers to an edge along the span 27 of the wind turbine blade 16. Such fabrication of the leading edge piece 42 and the trailing edge piece 44 provides enhanced smoothness and sharpness to the leading edge piece 42 and the trailing edge piece 44 respectively. Furthermore, the enhanced smoothness and sharpness increase aerodynamic and aero acoustic performance of the wind turbine blade 16 (FIG. 2) respectively. In yet another embodiment, additional stiffness may be built into the torsionally compliant segmented skin 32, proximate a leading edge region and a trailing edge region, thereby eliminating the need for the leading edge piece 42 and/or the trailing edge piece 44.

As illustrated herein, the torsionally compliant segmented skin 32 (FIGS. 2-4) is attached to the at least one chord stiffener 30 via an adhesive. In an alternate embodiment, the at least one chord stiffener 30 may be integrally fabricated with the torsionally compliant segmented skin 32. In operation, the torsionally compliant segmented skin 32 is functionally decoupled from the centrally disposed longitudinal spar 20, thereby relieving the torsionally compliant segmented skin 32 of flapwise, edgewise and torsional load conditions.

In the exemplary embodiment, the torsionally compliant segmented skin 32 provides an aerodynamic profile and resists aerodynamic pressures. In addition, the torsionally compliant segmented skin 32 is able to maintain its shape under aerodynamic pressure and enable twists without excessive deformation. The torsionally compliant segmented skin 32 does not contribute any torsional stiffness to the overall structure of the blade 16. The torsionally compliant segmented skin 32 is configured to take a substantial portion of the shear and torsional deformation exerted upon the blade structure. Such a structural configuration enables fabrication of structurally sound torsionally compliant segmented skin 32 having a minimal thickness, resulting in utilization of a minimal amount of fabricating material and thus reducing cost of manufacturing of the wind turbine blade 16. In an embodiment, the torsionally compliant segmented skin 32 may have a thickness on the order of 3 mm to about 25 mm. Additionally, employing the torsionally compliant segmented skin 32 reduces weight of the wind turbine blade 16 resulting in a lightweight wind turbine blade system 10 (FIG. 1).

Figure 5:
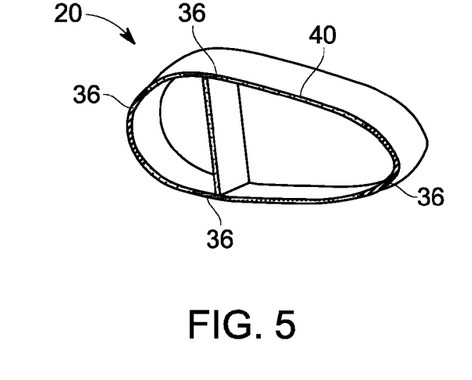
FIG. 5 is a schematic cross-sectional view of a portion of the longitudinal spar in accordance with an embodiment of the disclosure.
Figure 6:
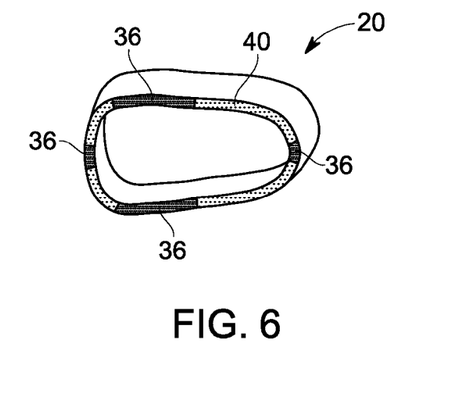
FIG. 6 is a schematic cross-sectional view of a portion of the longitudinal spar in accordance with an embodiment of the disclosure.
Figure 7:
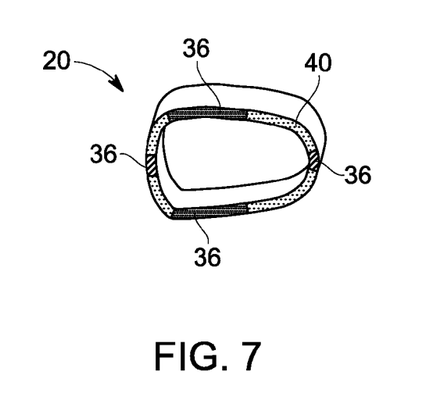
FIG. 7 is a schematic cross-sectional view of a portion of the longitudinal spar in accordance with an embodiment of the disclosure.
Figure 8:
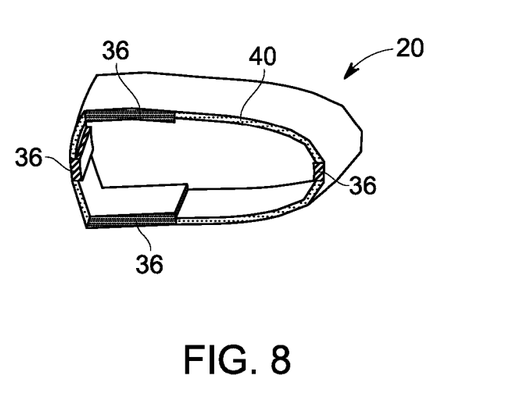
FIG. 8 is a schematic cross-sectional view of a portion of the longitudinal spar in accordance with an embodiment of the disclosure.

The centrally disposed longitudinal spar 20 is generally configured as a hollow spar beam including four or more spanwise spar caps to sustain the majority of the applied loads, thus enabling the independent design of flap, edge and torsional stiffness; these are also selected independently of the airfoil shape. In an embodiment, the four spar caps are connected predominately by foam which allows the torsional stiffness to be low and controllable. The internal structure of the centrally disposed longitudinal spar 20 does not require a rigid skin, allowing the skin to become a non-structural member. FIGS. 5-8 are varying diagrammatic illustrations of the centrally disposed longitudinal spar 20. In an embodiment, the centrally disposed longitudinal spar 20 may be configured as illustrated in FIG. 5 including a plurality of spar caps 36 and a central beam 38. The remaining portion of the spar 20 may be comprised of a structural material 40, such as glass, carbon, foam, balsa, or the like. The embodiments illustrated in FIGS. 6-8 are configured generally similar, including a plurality of spar caps 36 and structural filler material 40 disposed therebetween. As illustrated, the overall shape of the centrally disposed longitudinal spar 20 may be described as having a substantially circumferential cross-section, although varying overall shapes, such as circular, elliptical, D-shape or any other closed shape are anticipated.

Figure 9:
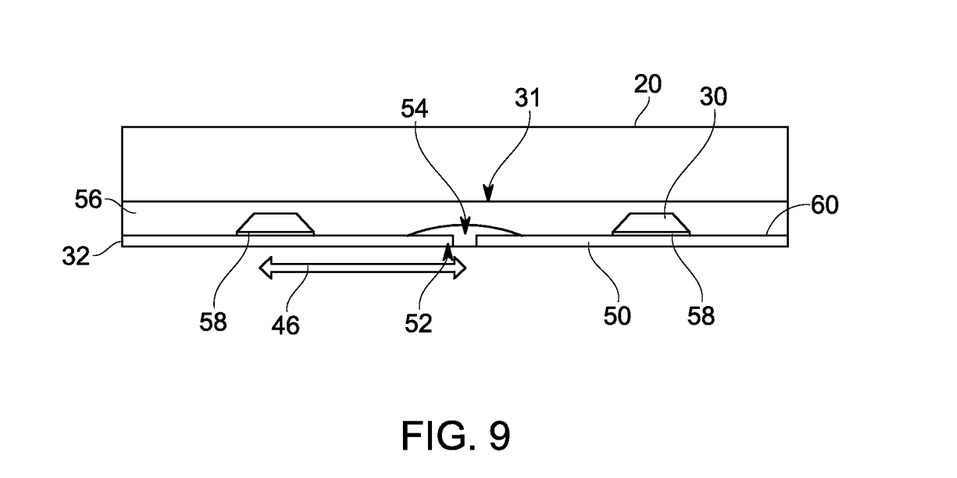
FIG. 9 is a schematic spanwise cross-sectional view of a portion of the wind turbine blade in accordance with an embodiment of the disclosure.
Figure 10:
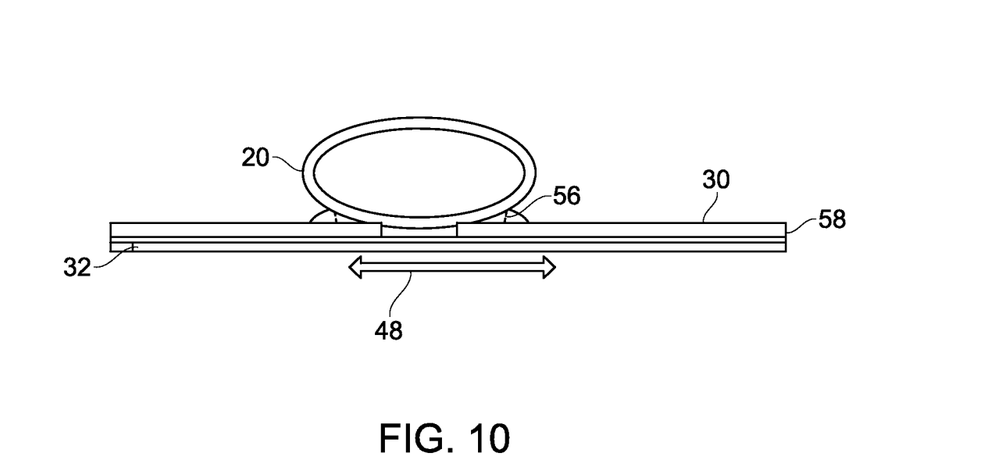
FIG. 10 is a schematic chordwise cross-sectional view of a portion of the wind turbine blade in accordance with an embodiment of the disclosure.

Referring now to FIGS. 9-12 illustrated are schematic cross-sectional views taken in a spanwise direction 46 (FIGS. 9 and 11) and a chordwise direction 48 (FIGS. 10 and 12) of a portion of the wind turbine blade 16 of FIG. 1. Illustrated in FIGS. 9-12 are alternative embodiment configurations for the centrally disposed longitudinal spar 20, the at least one chord stiffener 30 and the torsionally compliant segmented skin 32. More particularly, illustrated in FIGS. 9 and 10 is an embodiment illustrating the configuration of the centrally disposed longitudinal spar 20, the at least one chord stiffener 30 and the torsionally compliant segmented skin 32 wherein the compliant segmented skin 32 is configured as a plurality of composite skin panels, or segments, 50 having a gap 52 formed therebetween. The gap 52 having disposed therein a compliant sealant 54 to form the compliant joints 31 and providing for movement of the plurality of composite segments 50 relevant to one another when under a twisting load condition. More specifically, the inclusion of the compliant joints 31 allows for independent rotation of the skin segments 50 in response to a torsional load exerted thereon. The inclusion of the compliant joints 31 allow the torsional response of the blade 16 (i.e., blade twist) to be determined entirely by the internal structure and prevents buckling of the torsionally compliant segmented skin 32.

Figure 11:
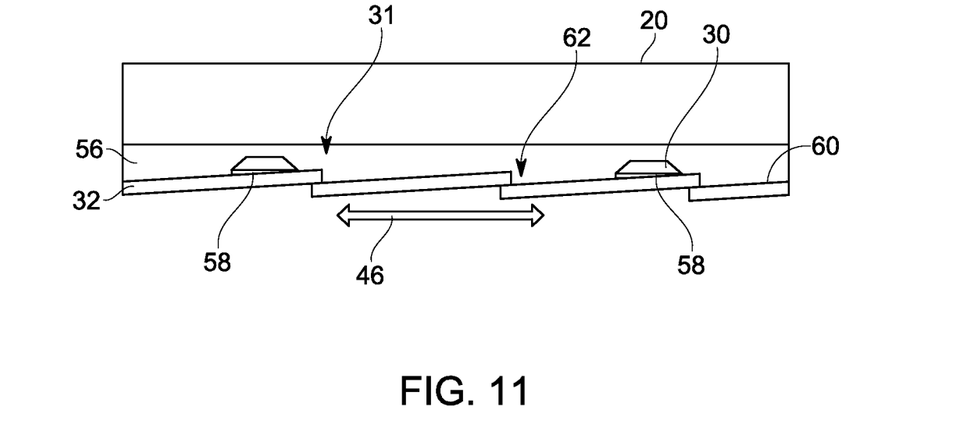
FIG. 11 is a schematic spanwise cross-sectional view of a portion of the wind turbine blade in accordance with an embodiment of the disclosure.
Figure 12:
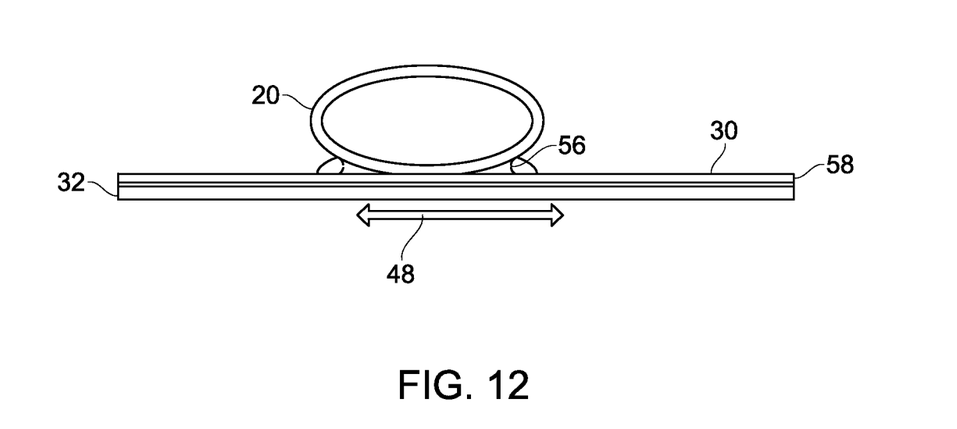
FIG. 12 is a schematic chordwise cross-sectional view of a portion of the wind turbine blade in accordance with an embodiment of the disclosure.

Illustrated in FIGS. 11 and 12 is an alternate embodiment illustrating the configuration of the centrally disposed longitudinal spar 20, the at least one chord stiffener 30 and the torsionally compliant segmented skin 32 wherein the torsionally compliant segmented skin 32 is configured as a plurality of composite skin panels, or segments, 50 configured in a partially overlapping configuration. More particularly, an overlap 62 is formed between adjacent skin panels 50 to form the compliant joints 31 and provide for movement of the plurality of composite segments 50 relevant to one another when under a twisting load condition. The inclusion of the overlap 62 between adjacent skin panels 50 allows the torsional response of the blade 16 (i.e., blade twist) to be determined entirely by the internal structure.

In the embodiments illustrated in FIGS. 9-12, the length of the skin panels 50 in the spanwise direction 46 between any two compliant joints 31 may be designed to avoid buckling under edge, flap and torsional loads. A first adhesive 56 may provide for coupling of the centrally disposed longitudinal spar 20 to the at least one chord stiffener 30. As previously described, the at least one chord stiffener 30 may be coupled to the torsionally compliant segmented skin 32 with an adhesive 58 or alternatively formed integral therewith. The at least one chord stiffener 30 is configured on an inner surface 60 of the torsionally compliant segmented skin 32 and in the chordwise direction 48. In varying embodiments, the at least one chord stiffener is configured to stop at the centrally disposed longitudinal spar 20 (as best illustrated in FIG. 10), or alternatively extend continuously over/under the centrally disposed longitudinal spar 20 (as best illustrated in FIG. 12).

As previously described, due to the aerodynamic purpose of the torsionally compliant segmented skin 32 and a blade response that is dominated by the internal blade structure, the same torsionally compliant segmented skin 32 may be used for multiple internal structure designs. This use results in manufacturing cost savings, for example, a single skin mold design may be used for multiple blade internal structures, such as when different internal structure designs may be desired depending on the amount of twist required which may be associated with a wind turbine blade system. Likewise, the same internal structure may be used with different skins. In that the blade response is dominated by the internal structure, different types of skin may be used as they become available. More specifically, if better or less expensive materials or manufacturing methods are developed, existing blades could be upgraded by removing the existing skin and installing a new one. This would maintain the same structural response with possibly improved aerodynamics. In addition, because the torsionally compliant segmented skin 32 is non-structural, aerodynamic upgrades can be easily installed on existing blades as they become available. In contrast to existing blades, where the skin is either structural, carrying torsional loads thereby opposing twist or at risk of buckling due to large deformations, these types of blade upgrades may help to reduce noise and improve efficiency without affecting the fundamental structural properties of the blade.

Figure 13:
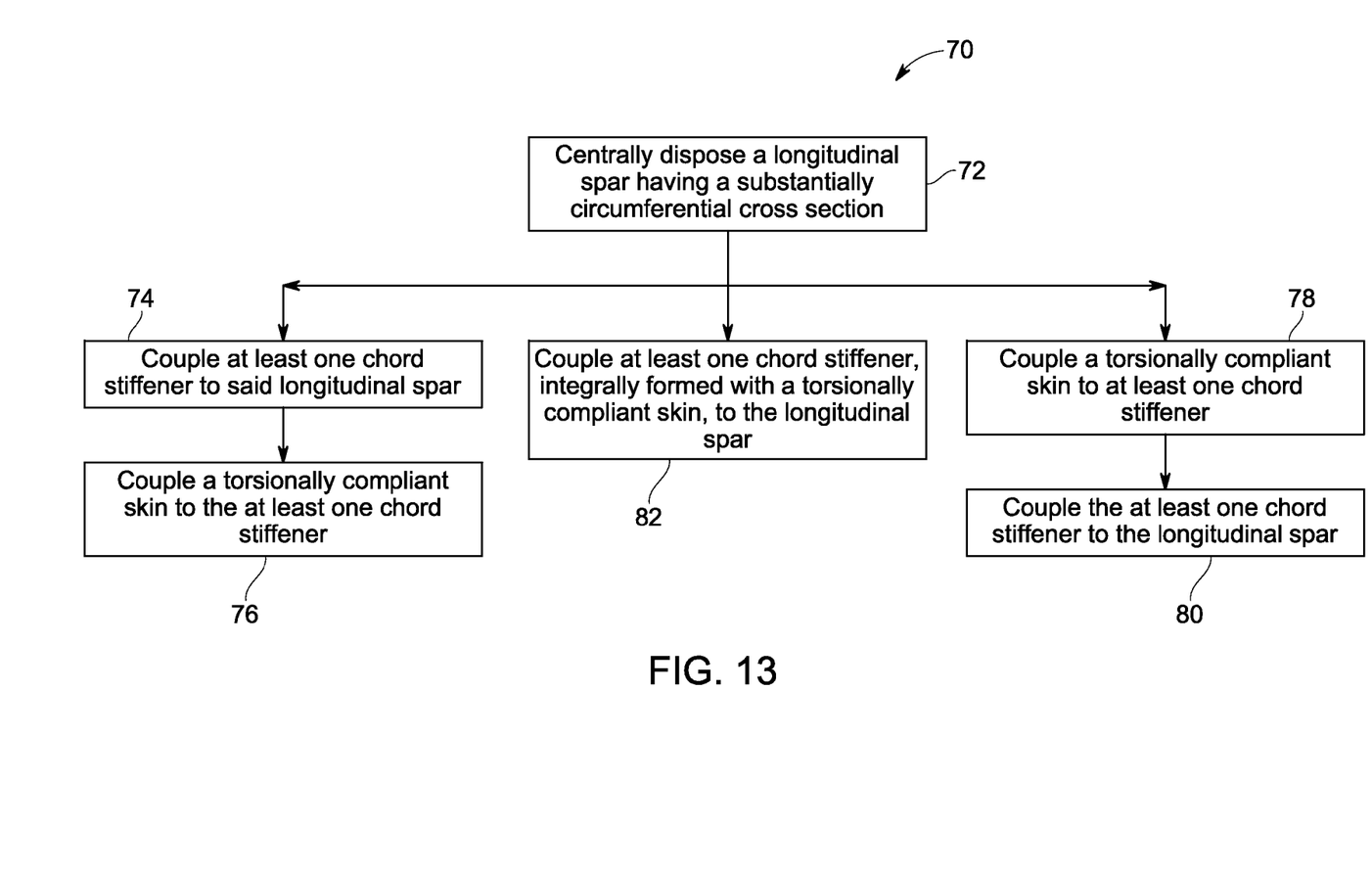
FIG. 13 is a flow chart representing steps involved in an exemplary method for fabricating the wind turbine blade in accordance with an embodiment of the disclosure.

FIG. 13 is a flow chart representing steps involved in an exemplary method 70 for fabricating a wind turbine blade of FIGS. 2-12 in accordance with an embodiment of the disclosure. The method 70 includes disposing a longitudinal spar having a substantially circumferential cross section at a center of the wind turbine blade in a step 72. In an embodiment of the disclosure, a hollow or a solid longitudinal spar is provided. In another embodiment of the disclosure, a circular shape, an elliptical shape, a D-shape or any other closed shape longitudinal spar is provided. In an embodiment, a tapering cross-sectional area in a direction along a span of the wind turbine blade is provided to the circular shape, the elliptical shape, the D-shape or any other closed shape. In a first embodiment of the method, the at least one chord stiffener is coupled to the longitudinal spar, in a step 74. In an embodiment of the disclosure, the at least one chord stiffener is coupled to an outer surface of the longitudinal spar via a bonding process. In an exemplary embodiment of the disclosure, the bonding process is at least one from a group of an adhesive, wet lay up or suitably designed riveting process. The first embodiment of the method 70 further includes coupling the torsionally compliant segmented skin to the at least one chord stiffener, in a step 76.

In an alternate, or second, embodiment of the method described herein, subsequent to disposing a longitudinal spar having a substantially circumferential cross section at a center of the wind turbine blade, in step 72, the torsionally compliant segmented skin is coupled to the at least one chord stiffener, in a step 78. In an embodiment of the disclosure, the torsionally compliant segmented skin is first coupled to an outer surface of the at least one chord stiffener via a bonding process. The second embodiment of the method 70 further includes coupling the at least one chord stiffener, having the torsionally compliant segmented skin previously coupled thereto, to the longitudinal spar of the wind turbine blade, in a step 80.

In yet another alternative embodiment of the disclosure, the at least one chord stiffener may be integrally formed with the torsionally compliant segmented skin. Accordingly, subsequent to disposing a longitudinal spar having a substantially circumferential cross section at a center of the wind turbine blade, in step 72, the at least one chord stiffener, integrally formed with the torsionally compliant segmented skin, is coupled to longitudinal spar, in a step 82. In the presently contemplated embodiments of the method, the centrally disposed longitudinal spar and the torsionally compliant segmented skin are functionally decoupled to relieve the torsionally compliant segmented skin of one or more of a flapwise load condition, an edgewise load condition and a torsional load condition.

The various embodiments of a fluid turbine blade described above provide a fluid turbine blade with desired enhanced twist, a functionally decoupled structural stiffness, high efficiency and reliability. The fluid turbine blade incorporates a centrally disposed longitudinal spar having a substantially circumferential cross section that reduces the weight of the fluid turbine blade and has greater load bearing capacity. The fluid turbine blade incorporates an innovative structural configuration including at least one chord stiffener attached to a torsionally compliant skin that facilitates employing a non-structural skin of reduced thickness that is able to avoid buckling under edge, flap and torsional loads. Thus, these techniques reduce the weight of the fluid turbine blade resulting in reduced costs of manufacturing the fluid turbine blade. The structural response of the blade is uniquely controlled by the internal structure, wherein the internal structure is independent of the aerodynamic shape required to capture energy. In that the structural response is dominated by the internal structure, and not the aerodynamic shape, the flap, edge and torsional stiffness may be independently optimized.

Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein. Furthermore, the skilled artisan will recognize the interchangeability of various features from different embodiments. Similarly, the various features described, as well as other known equivalents for each feature, can be mixed and matched by one of ordinary skill in this art to construct additional systems and techniques in accordance with principles of this disclosure.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

What is claimed is:

1. A fluid turbine blade comprising:
a centrally disposed longitudinal spar having a substantially circumferential cross section and including a central beam extending a complete length of the fluid turbine blade;
at least one chord stiffener coupled to the longitudinal spar; and
a torsionally compliant segmented skin overlying and adjoining the at least one chord stiffener, the torsionally compliant segmented skin comprising a plurality of skin segments including a compliant joint extending in a chordwise direction therebetween adjoining skin segments of the plurality of skin segments to provide movement of the plurality of skin segments relative to one another when under the influence of one or more load conditions, wherein the compliant joint is one of a gap including a compliant sealant disposed therebetween or an overlap,
wherein the centrally disposed longitudinal spar and the torsionally compliant segmented skin are functionally decoupled to relieve the torsionally compliant segmented skin of one or more of a flapwise load condition, an edgewise load condition and a torsional load condition.

2. The fluid turbine blade of claim 1, wherein the fluid turbine blade comprises a wind turbine blade or a marine hydrokinetic energy turbine blade.

3. The fluid turbine blade of claim 1, wherein the centrally disposed longitudinal spar comprises a hollow, a solid, or a filled spar.

4. The fluid turbine blade of claim 1, wherein the centrally disposed longitudinal spar comprises one of a circular shape, an elliptical shape, a D-shape, or an enclosed shape.

5. The fluid turbine blade of claim 4, wherein the circular shape, the elliptical shape or the D-shape comprises a tapering cross sectional area in a direction along a span of the fluid turbine blade.

6. The fluid turbine blade of claim 1, wherein the at least one chord stiffener is adhesively coupled to the centrally disposed longitudinal spar.

7. The fluid turbine blade of claim 1, wherein the at least one chord stiffener is adhesively coupled to the torsionally compliant segmented skin.

8. The fluid turbine blade of claim 1, wherein the at least one chord stiffener is integrally formed with the torsionally compliant segmented skin.

9. A method of fabricating a fluid turbine blade comprising:
centrally disposing a longitudinal spar of a fluid turbine blade having a substantially circumferential cross section and including a central beam extending from a blade mount to a tip of the fluid turbine blade; and
coupling at least one chord stiffener to the longitudinal spar and adjoining a torsionally compliant segmented skin to the at least one chord stiffener, a torsionally compliant segmented skin overlying and coupled to the at least one chord stiffener, the torsionally compliant segmented skin comprising a plurality of skin segments including a compliant joint extending in a chordwise direction therebetween adjoining skin segments of the plurality of skin segments to provide movement of the plurality of skin segments relative to one another when under the influence of one or more load conditions, wherein the compliant joint is one of a gap including a compliant sealant disposed therebetween or an overlap,
wherein the centrally disposed longitudinal spar and the torsionally compliant segmented skin are functionally decoupled to relieve the torsionally compliant segmented skin of one or more of a flapwise load condition, an edgewise load condition and a torsional load condition.

10. The method of claim 9, wherein fabricating the fluid turbine blade comprises fabricating a wind turbine blade or a marine hydrokinetic energy turbine blade.

11. The method of claim 9, wherein coupling the at least one chord stiffener to the longitudinal spar comprises attaching the at least one chord stiffener to an outer surface of the centrally disposed longitudinal spar via a bonding process comprising at least one from a group of adhesive, wet layup, or suitably designed riveting process.

12. The method of claim 9, wherein coupling the torsionally compliant segmented skin to the at least one chord stiffener comprises one of integrally forming the at least one chord stiffener with the plurality of skin segments or adhesively attaching the at least one chord stiffener to the plurality of skin segments.

13. A wind turbine blade comprising:
a centrally disposed longitudinal spar of the wind turbine blade having a substantially circumferential cross section and extending from a blade mount to a tip of the fluid turbine blade;
at least one chord stiffener coupled to the centrally disposed longitudinal spar; and
a torsionally compliant segmented skin overlying and adjoining the at least one chord stiffener, the torsionally compliant segmented skin comprising a plurality of skin segments including a compliant joint extending in a chordwise direction therebetween adjoining skin segments of the plurality of skin segments to provide movement of the plurality of skin segments relative to one another when under the influence of one or more load conditions, wherein the compliant joint is one of a gap including a compliant sealant disposed therebetween or an overlap,
wherein the centrally disposed longitudinal spar and the torsionally compliant segmented skin are functionally decoupled to relieve the torsionally compliant segmented skin of one or more of a flapwise load condition, an edgewise load condition and a torsional load condition.

* * * * *